United States Patent [19]

Palmcrantz

[11] 3,953,052

[45] Apr. 27, 1976

[54] SUPPORT LEGS OF MOBILE CRANES

[75] Inventor: Jan Birger Palmcrantz, Harmanger, Sweden

[73] Assignee: Hiab-Foco Aktiebolag, Hudiksvall, Sweden

[22] Filed: Sept. 23, 1974

[21] Appl. No.: 508,058

[30] Foreign Application Priority Data

Oct. 18, 1973 Sweden .............................. 7314177

[52] U.S. Cl. ................................ 280/763; 212/145; 248/354 R

[51] Int. Cl.² ............................................ B60S 9/12

[58] Field of Search ...................... 248/354 R, 188.5; 180/41; 212/145; 280/150.5; 211/105.3; 403/104, 109

[56] References Cited

UNITED STATES PATENTS

| | | | |
|---|---|---|---|
| 1,705,625 | 3/1929 | Mitchell | 403/109 X |
| 2,772,550 | 12/1956 | Harrington | 403/109 X |
| 2,777,586 | 1/1957 | Boysen et al. | 212/145 |
| 3,007,717 | 11/1961 | Noly | 212/145 X |
| 3,020,858 | 2/1962 | Perkins et al. | 212/145 |
| 3,021,016 | 2/1962 | Noll et al. | 212/145 |
| 3,073,467 | 1/1963 | Parks | 280/150.5 X |
| 3,338,426 | 8/1967 | Grove | 212/145 |
| 3,840,125 | 10/1974 | Cozad | 212/145 |

FOREIGN PATENTS OR APPLICATIONS

| | | | |
|---|---|---|---|
| 1,251,928 | 10/1967 | Germany | 212/145 |
| 564,312 | 11/1932 | Germany | 248/354 R |

*Primary Examiner*—Roy D. Frazier
*Assistant Examiner*—Rodney H. Bonck
*Attorney, Agent, or Firm*—Newton, Hopkins & Ormsby

[57] ABSTRACT

In support legs intended for mobile cranes and comprising telescopically displaceable jib sections, an arrangement permitting maximum jib length while retaining complete stability of the crane, said arrangement including a support arm extending in the direction of the displacement of said jib sections and supported at one end by the crane base and abutting at its opposite end against the inner jib section, said support arm additionally provided with means to limit the degree of extension of said inner jib section.

8 Claims, 4 Drawing Figures

SUPPORT LEGS OF MOBILE CRANES

BACKGROUND OF THE INVENTION

Mobile cranes, i.e. cranes supported on vehicles, must be provided with support legs preventing the vehicle from tipping over during the crane loading operations. In constructing support legs and the jibs therefor it is necessary to consider a. the maximum vehicle width permissible b. that when the support leg jib is fully extracted a not unimportant portion of its total length must rest in the crane base cross beam in order that the stress on the load-bearing parts remain at the permitted values, and c. that when the jib sections are formed so as to be telescopically displaceable relative to one another it is normally necessary that the inner jib beam is formed with a support shoulder against which the outer jib beam abuts whereby its displacement into the crane base is interrupted, for which reason this latter jib beam cannot be made as long as the crane base cross beam would otherwise permit, could its entire length have been utilized.

SUMMARY OF THE PRESENT INVENTION

The present invention is based on the above-mentioned knowledge and concerns an improvement of the support leg construction in that it permits elimination of the obstructive support shoulder in the crane base cross beam and thus permits the provision of considerably longer jib beams as well as further extraction of the latter without exceeding the permissible values of the loading stress. More precisely, the invention concerns mobile crane support legs of the kind which are provided with jib sections which are arranged for telescopic displacement into one another and are movable inside the crane base in a direction transverse to the vehicle chassis. It is characteristic of the invention that the inner jib section is displaceable above and in the longitudinal direction of a support arm one end of which is supported close to and by that side of the crane base where the support leg incorporating the outer jib section is positioned and the opposite end of which abuts against the inner jib section, preferably inside the latter, and that at some point intermediate its ends the arm supports that end of the inner jib section which is positioned inside the crane base.

BRIEF DESCRIPTION OF THE DRAWINGS

The invention will be described more in detail in the following with reference to the accompanying, partly diagrammatical drawings, wherein.

DETAILED DESCRIPTION OF A PREFERRED EMBODIMENT

Figure 1:
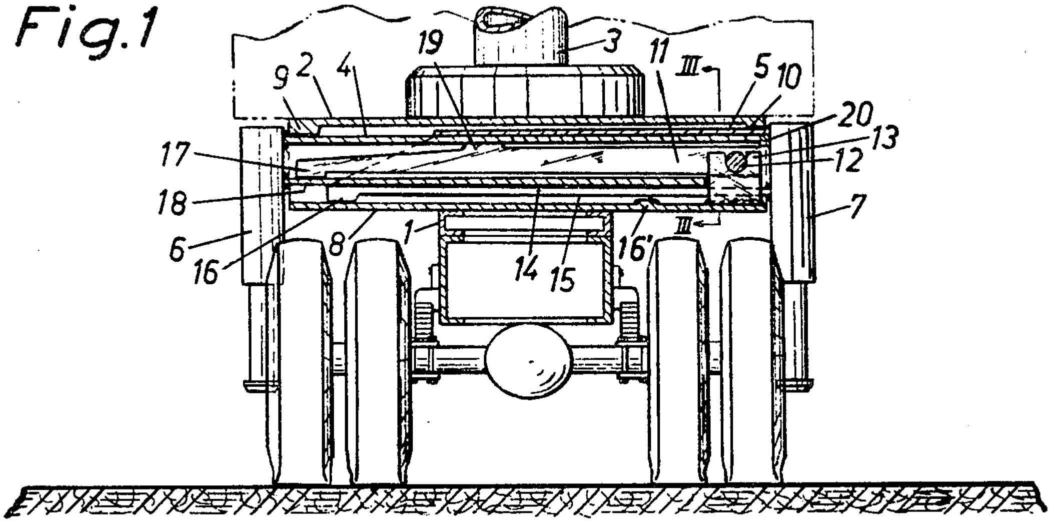
FIG. 1 is a vertical cross-sectional view through a mobile crane, the support legs being in their inner, retracted position.

In the base 2 of the crane 3 supported by the vehicle chassis 1 jib sections 4, 5 are telescopically displaceable into one another in a direction transverse to the vehicle chassis, support legs 6, 7 being mounted at the outer ends of these jib sections. The jib sections 4, 5 are displaceable in one, 8, of the cross beams of the crane base. Through the jib sections which are in the form of square beams are arranged to pass guides 9, 10 provided at the ends of the cross beam 8.

Inside the cross beam 8 is arranged a support arm 11 through one end of which passes a bolt 12 so as to rest in a fork-shaped bracket 13 in the interior of the cross beam 8 at the end thereof adjacent the support leg 7. The bracket 13 passes through a longitudinally extending slit 14 formed in the lower wall 15 of the outer jib section 5. This jib section 5 is provided at its inner end with a stop shoulder 16 which cooperates with a second stop shoulder 16′ formed in the interior of the cross beam 8 to limit the outwards displacement of the jib section. The opposite end of the support arm 11 support a shoulder 17 by means of which the arm abuts against the lower wall 18 of the inner jib section 4. Between the bolt 12 and the shoulder 17 the support arm 11 presents an upright shoulder 19. That end 20 of the inner jib section 4, which is positioned inside the cross beam 8, is arranged to abut against the shoulder 19 when the jib section is fully extended. Also the inner jib section 4 is provided with a stop shoulder or similar means arranged to limit the jib section extension to the outer position (operative position).

Figure 2:
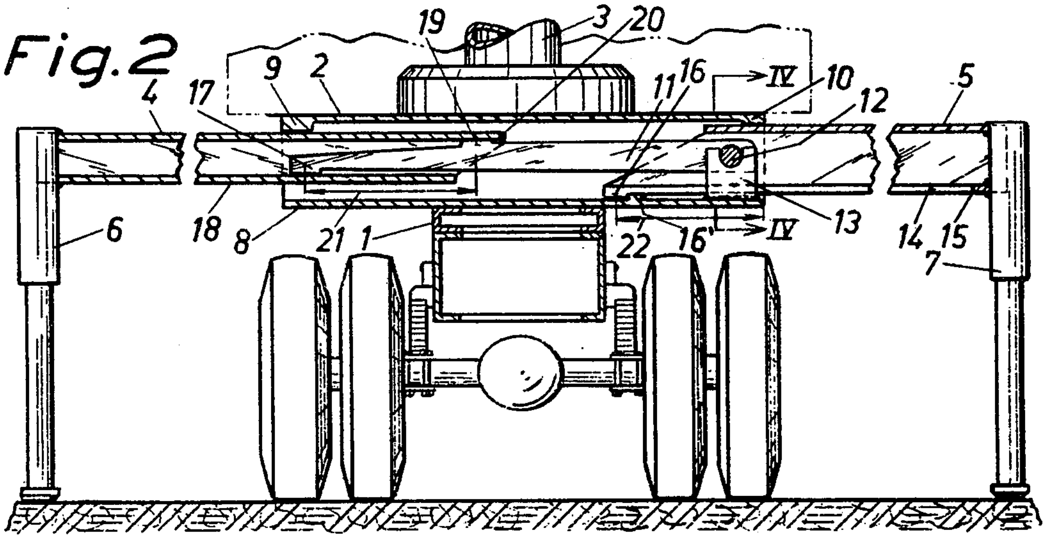
FIG. 2 is a similar cross-sectional view showing the support legs in operative position.
Figure 3:
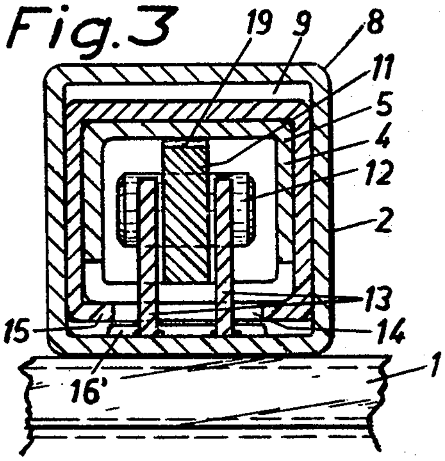
FIG. 3 illustrates on an enlarged scale a vertical section along line III—III of FIG. 1.
Figure 4:
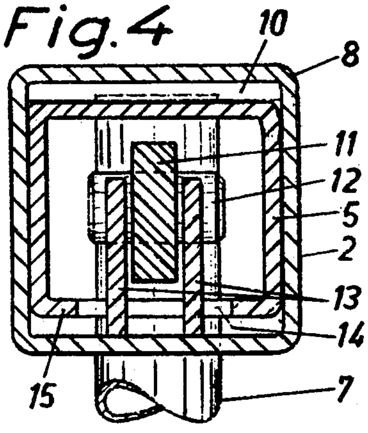
FIG. 4 shows a similar sectional view along line IV—IV of FIG. 2.

As clearly appears from FIG. 2, in comparison with FIG. 1, the support legs 6, 7 may, together with their jib sections 4, 5, be extended from a compact, retracted and inoperative position into a widely separated, extracted position wherein the momentum arms 21 and 22 nevertheless achieve considerable length which means that the stress on the load-bearing parts may be kept within permissible values.

The embodiment as illustrated and described is to be regarded as an example only and particularly the arrangement of the support arm 11 may be altered in various ways within the scope of the invention. The mounting of the support arm 11 thus may be effected in other ways than by means of a through-bolt 12. In the drawings, the support arm 11 is illustrated in a position inside the inner jib section 4 but in accordance with another embodiment it may be formed as a fork with its two legs extending one at either side of the inner jib section and cooperating with slide rails provided on the external jib face.

What I claim is:

1. An improvement in support legs intended for mobile cranes, said cranes including a vehicle chassis and a base supported by the vehicle chassis, said support legs comprising inner and outer jib sections arranged for telescopic displacement into each other and for movement into opposite ends of a crane base in a direction transverse to the vehicle chassis said inner and outer jib sections each having inner ends located within the base, said sections having an extended position in which said ends lie spaced within the base and a retracted position in which said sections are telescopically received within said base with said inner jib section telescopically received in said outer jib section, the improvement comprising a support arm, said inner jib section being displaceable into the base telescopically to receive said support arm, one end of said arm being supported adjacent to and by that side of said crane base where said support leg incorporating said outer jib section is positioned, the opposite end of said support arm abutting against the interior of the inner jib section, and said support arm supporting at some point intermediate its two ends, that end of said inner jib section which is positioned inside said crane base.

2. An improvement in support legs as claimed in claim 1, said jib sections being in the form of box beams, the improvement comprising a bracket formed in said crane base, one end of said support arm mounted on said bracket, and a longitudinally extending slit formed in said outer jib section, said bracket arranged so as to penetrate through said longitudinal slit.

3. An improvement in support legs as claimed in claim 2, comprising an upstanding shoulder formed on said support arm, the interior of said inner jib section adjacent the end thereof which is positioned inside said crane base abutting against said shoulder when said support leg is in its extended position.

4. An improvement in support legs as claimed in claim 3, comprising a downwardly directed shoulder on said inner end of said outer jib section, said crane base being in the form of a hollow cross beam supporting said crane, a second shoulder formed on said cross beam, said downwardly directed shoulder, upon extended position of said jib section, abutting against said second shoulder on said cross beam.

5. In a mobile crane assembly which includes a vehicle chassis having a rigid base structure extending transversely thereof, a pair of vertical support legs adapted to be moved between a retracted position in which they lie closely adjacent said base structure at the opposite sides of said chassis and an extended position in which they are positioned in outrigger fashion with respect to the vehicle chassis, an outer jib section having an outer end fixed to one support leg and an inner jib section having an outer end fixed to the other support leg, each jib section being of a length substantially equal to the transverse dimension of said chassis defined by said base structure and said inner jib section being telescopically received in said outer jib section when said support legs are in said retracted position and said jib sections having inner ends which are separated from each other when said support legs are in said extended position, said base structure defining a transverse, horizontal channel slidably receiving said jib sections whereby when said jib sections are in extended position, longitudinally spaced points of a length of the inner end of said outer jib section are engaged by said base structure rigidly to cantilever said outer jib section from said base structure whereas only an intermediate portion of said inner jib section is engaged by said base structure leaving said inner end thereof unsupported by said base structure, and support arm means carried by said base structure for engaging the unsupported inner end of said inner jib section when it is extended to cooperate with said base structure and rigidly cantilever said inner jib section from said base structure, said support arm means comprising an elongate arm telescopically slidable within said inner jib section.

6. In a mobile crane assembly as defined in claim 5 wherein said base structure includes a bracket pivotally mounting one end of said support arm.

7. In a vehicle crane assembly as defined in claim 6 wherein said outer jib section is of hollow form, said bracket projecting into said outer jib section and said outer jib section having a longitudinal slot allowing the outer jib section to slide relative to said bracket.

8. In a mobile crane assembly as defined in claim 7 wherein said bracket is located adjacent that side of the chassis from which said outer jib section is extensible and said support arm extends therefrom substantially to the opposite side of the support structure.

* * * * *